Jan. 24, 1928.
P. J. HASE
1,657,393
SEED SOWING MACHINE
Filed Aug. 26, 1922    3 Sheets-Sheet 3
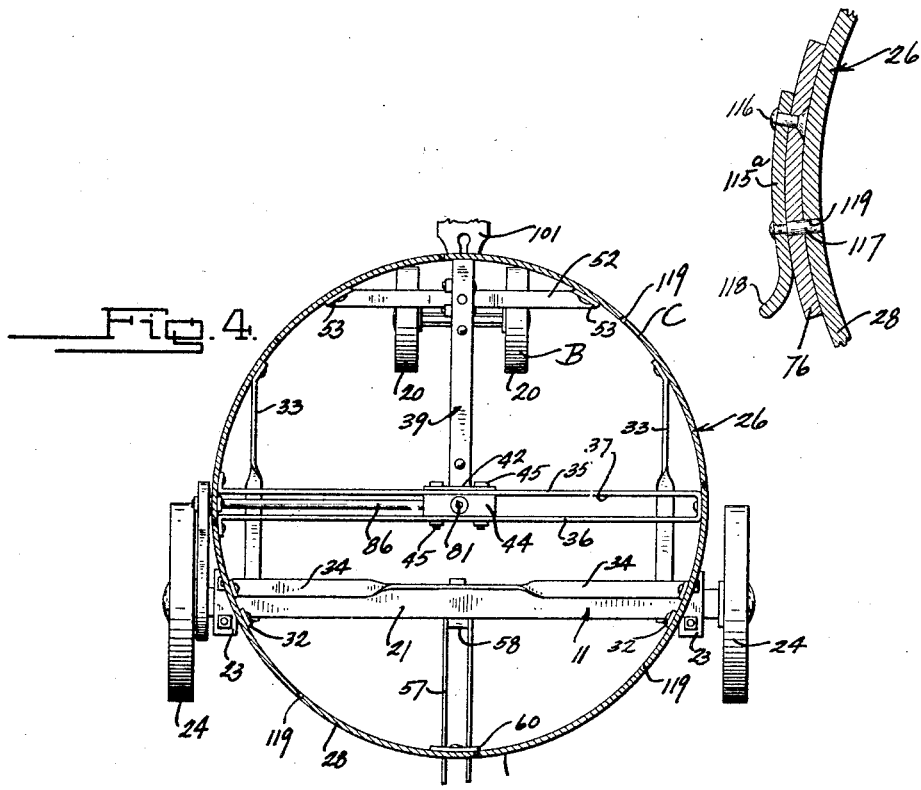
Inventor
Paul J. Hase Patented Jan. 24, 1928.

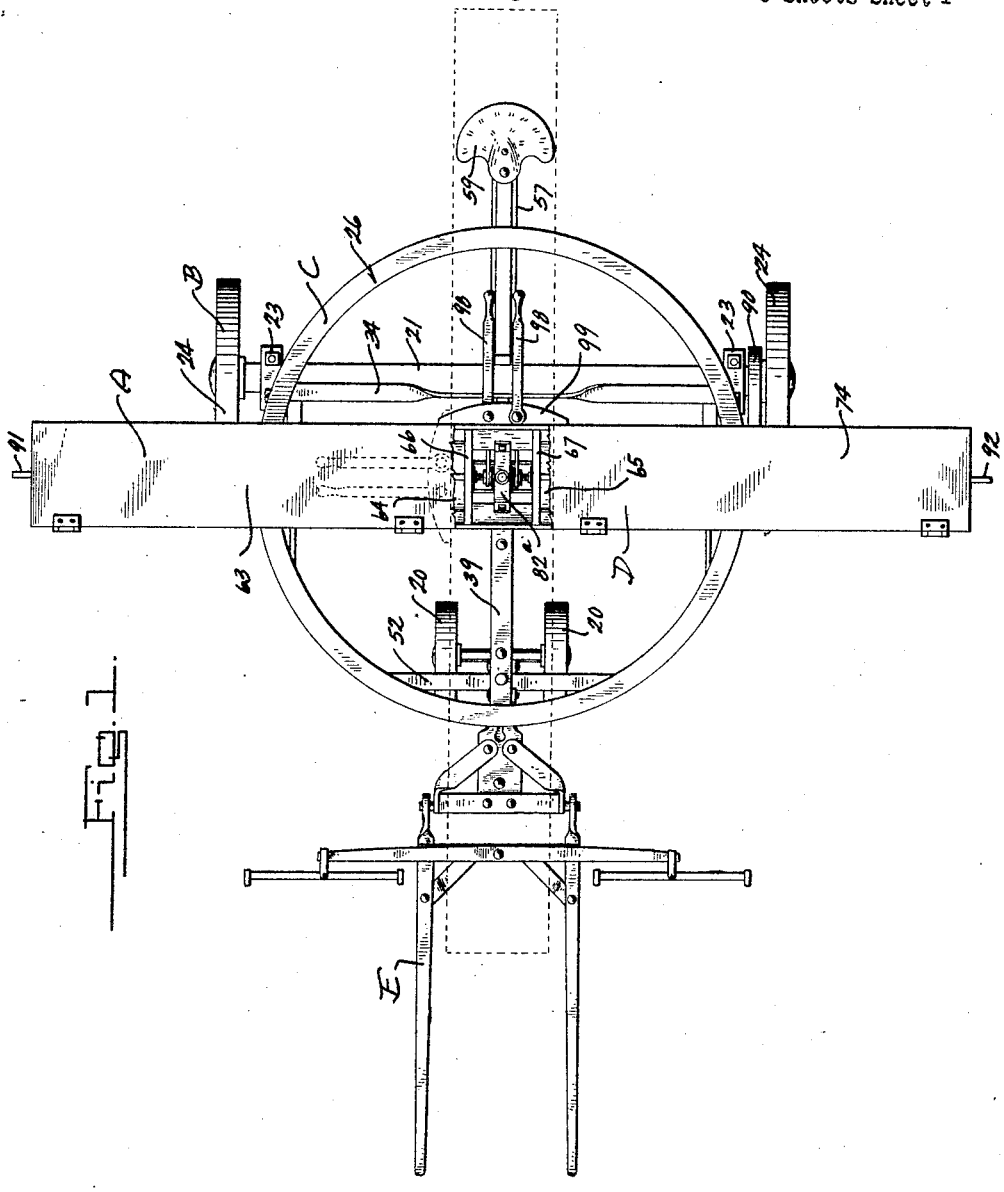

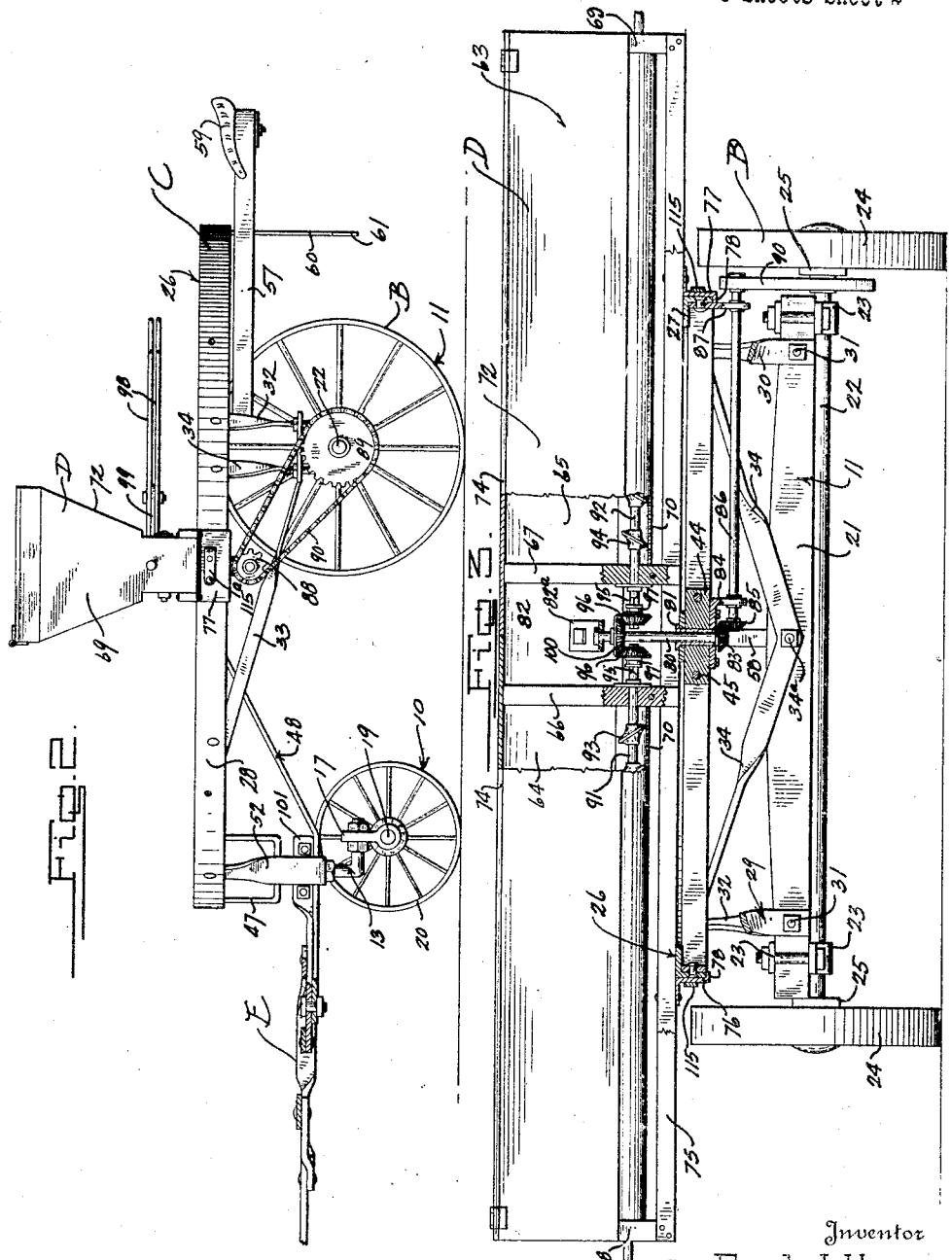

1,657,393

UNITED STATES PATENT OFFICE.

PAUL J. HASE, OF SCHALLER, IOWA.

SEED-SOWING MACHINE.

Application filed August 26, 1922. Serial No. 584,489.

This invention relates to an improved machine for the sowing of seeds.

The primary object of this invention is the provision of a practical, compact and relatively simple seed sowing machine, which by its simple arrangement of operating parts, may be operated by a single individual to effectively distribute seeds over a large area in a minimum of time.

A further object of the invention is the provision of an improved sower embodying a seed distributing device, which may be adjusted so that the improved machine may be readily transported through relatively narrow gateways, doorways, and travel over relatively narrow roadways with ease.

A further object of the invention is the provision of a sowing machine of the above mentioned character, which embodies a plurality of seed distributing arrangements which may be selectively operated to throw seeds upon either or both sides of the machine.

Other objects and advantages of this invention will be apparent during the course of the following detailed description.

In the accompanying drawings, forming a part of this specification, and wherein similar reference characters designate corresponding parts throughout the several views.

Figure 1 is a plan view of the improved seed sowing machine,

Figure 2 is a side elevation of the improved seed sowing machine,

Figure 3 is a transverse cross sectional view, taken through the body of the improved sowing machine, showing the cooperating details thereof.

Figure 4 is a plan view, partly in section, showing cooperating details of the supporting frame and running gear embodied in the improved machine.

Figure 5 is a transverse cross sectional view showing a locking arrangement embodied in the improved seed sowing machine.

In the drawings, wherein for the purpose of illustration is shown but the preferred embodiment of this invention, the letter A designates the improved seed sowing machine, which embodies a running gear B; supporting frame C; seed receiving and distributing arrangement D; and a shaft arrangement E.

Referring to the running gear B, the same includes a front supporting arrangement 10 and a rear supporting arrangement 11. The front supporting arrangement 10 includes a supporting bolt 13 to which the supporting frame C and draft arrangement E are pivotally connected in a manner to be subsequently described. To this bolt 13 a casting 17 is clamped, which receives axle 19. A pair of wheels 20 of relatively small diameter are rotatably secured to the outer ends of the front axle shaft 19, said wheels 20 being disposed in rather close relation. The rear axle arrangement 11 embodies a supporting beam 21, beneath and longitudinally of which the rear axle shaft 22 is disposed. Adjustable bearing clamp members 23 are secured to the outer ends of the beam 21 to rotatably support the axle shaft 22 therein so that the ends of said axle shaft 22 extends beyond the ends of the beam 21 to rotatably receive the rear supporting wheels 24 in the enclosed hubs 25.

Referring to the supporting frame C, the same preferably includes a ring shaped trackway 26, which is preferably constructed of angle iron, and forms a true circle; providing the inwardly extending horizontal flange portion 27, and the vertically positioned depending flange portion 28. This ring shaped trackway 26 is supported in a horizontal plane upwardly of the wheels and axles of the running gear B, side supporting brackets 29 and 30 being provided for attachment, as by bolts 31, through the ends of the axle support beam 21; each of the braces 29 and 30 including a vertical leg 32 which is attached to the inside surface of the trackway flange 28 directly above the rear axle, and a diagonal forwardly extending leg portion 33, which is connected to the inside surface of the flange 28. In this position, the center of the trackway 26 lies considerably forward of the line of the rear axle arrangement 11. The trackway 26 is further braced on the rear axle beam 21 by the transverse upwardly extending diagonal braces 34, which are attached by means of a bolt 34ª centrally of the axle beam 21 and have their outer ends connected to the inside flange 28 of the trackway 26 directly above the axle beam 21.

A pair of cross beams 35 and 36 extending in parallel spaced relation are diametrically connected to the depending flange portion 28 of the trackway 26 to provide the space 37 therebetween extending diametrically of the ring shaped trackway 22 and through which seeds are adapted to fall during a sowing operation. These beams 35 and 36 may be provided from a single piece of material bent intermediate its ends, substantially as is illustrated in Figure 4 of the drawings. A radial brace member or bracket 39 may be provided for connection of the forward part of the frame C to the front axle arrangement 10. This bracket 39 includes a portion 40 which extends radially with respect to the trackway 26 and which is attached in any approved manner to a plate 42. The plate 42 is adapted for lying upon the front surface of the cross beam 35, so that the brace arm 40 may extend at right angles to said beam 35. A bearing block 44 is preferably provided within the space 37 between beams 35 and 36 so that the center of this trackway 26 is through the block 44, said block 44 as well as the plate 42 being connected to the cross beams 35 and 36 by detachable bolt members 45. The forward end 47 of the bracket 39 is bent downwardly in rectangular formation to provide a bearing through which the upper end of the front axle bolt 13 is pivotally connected. In order to stabilize the lower end of the bolt 13, as well as to provide additional reinforcements for the supporting frame C, a bracket 48 is provided. A front cross brace 52 is riveted at 53 to the trackway 26, and pivotally receives the bolt 13.

A rearwardly extending arm member 57 is provided, which is connected to an upstanding bracket 58 mounted upon the rear axle beam 21. This supporting arm 57 extends radially outwardly of the trackway 26 and is provided with a seat member 59 upon the rear end thereof outside of the trackway 26. A depending bracket 60 carried by the inside surface of the flange 28 of trackway 26 depends for supporting the arm 57, and provides a pair of laterally extending foot receiving projections 61 thereon.

Referring to the grain receiving and distributing apparatus D, the same includes the elongated container 63, of any approved construction, which is subdivided into bins or compartments 64 and 65 by means of the inside walls or partitions 66 and 67 which are placed in spaced relation intermediate the end walls 68 and 69 of the container 63. Each of the bins 64 and 65 include a bottom 70 which is provided with suitable openings or perforations therein for the distribution of grain. The side walls 72 of the container 63 are inclined, as in the well known construction, and the bins 64 and 65 are provided with the closure lids 74. A pair of spaced supporting beams 75 are carried by the container 63 below the floors 70 by certain depending ends of the partitions 66 and 67 and the end walls 68 and 69. These beams 75 are provided with the angle guide members 76 and 77 depending therefrom, and which engage the outer smooth surface of the trackway flange 28 at diametrically opposed points, so that the container 63 is diametrically positioned upon the trackway 28. The lower horizontal angled end 78 of the guide members 76 and 77 engage the lowermost edge of the trackway flange 28 to prevent any likelihood of horizontal displacement or tipping of the container 63. As these members 76 and 77 slidably engage the trackway 26 at diametrically opposed points, it can readily be understood that the container 63 may be transversely, diagonally, or longitudinally adjusted upon the improved sower A and which is a very desirable arrangement. During a sowing operation the container 63 will, of course, be transversely disposed with respect to the run or longitudinal center of the sower A so that seeds dropping through the apertures in the floors 70 will pass through the space 37 intermediate cross braces 35 and 36.

A drive mechanism is provided as a part of the improved apparatus D, which includes a vertical shaft 80 positioned centrally of the trackway 26 and supported within a hollow bearing bolt structure 81 mounted in the block 44. The upper end of this shaft 80 is pivotally supported and laterally braced by a bracket 82ᵃ which is mounted interiorly of the container 63 intermediate the dividing partitions 66 and 67, the space or compartment 82 intermediate said partition providing a gear chamber. The lower end of shaft 80 is provided with a bevelled gear 83 which is mounted just below a bracket 84, said bracket 84 being connected to the lower surface of the block 44. A bevelled gear 85 is mounted upon a horizontal shaft 86, and disposed in meshing relation with the bevelled gear 83. The shaft 86 extends transversely of the machine A and is pivotally supported at its outer end by a bracket 87 depending from connection with the trackway flange 28. A relatively small sprocket wheel 88 is provided outwardly on the end of the horizontal shaft 86, which is connected to a relatively large sprocket 89 upon the rear axle shaft 22, as by a link belt 90. Distributor shafts 91 and 92 are respectively provided in the bins 64 and 65. The shaft 91 has the ends thereof bearing in the wall and partition 68 and 66 respectively and horizontally disposed just upwardly of the floor 70, with the grain or seed displacing shoes 93 mounted thereon over the apertures in the floor 70. In similar manner, the shaft 92 is mounted in the partition and end wall 67 and 69 respectively just upwardly of the floors 70, with the shoes 94 provided thereon. The ends of the shafts 91 and 92 extend into the chamber 82 and are squared as at 95 for slidably receiving gears 96. These gears 96 may be longitudinally slid on the squared ends 95, each including collars 97 in which the forked ends of the adjusting levers 98 are carried; said levers 98 being oscillatively connected to a shaft 99 which is mounted upon the container 63, so that said levers 98 extend substantially at right angles to the run of said elongated container 63. The gears 96 are adapted to be placed into meshing relation with a bevelled gear 100, which is mounted upon the upper end of the vertical shaft 80 within the gear chamber 82 so that the shafts 91 and 92 may be selectively driven.

During operation of the improved machine in a field the operator is of course seated on the seat member 59, and the levers 98 are readily accessible so that the gears 96 may be moved into or out of meshing relation with the gear 100 for driving the shafts 91 and 92. The seed container 63 may be diagonally adjusted with respect to the machine A so that the seeds may drop the proper distance into the rows in a field, it being understood, of course, that the seed device D rotates or is adjusted with the vertical shaft 80 as a center.

The container 63, in order that a sowing operation may cover as wide an area as possible is relatively long. The length of the container 63 will, in fact, be such as to interfere with the passage of the machine A through narrow gateways and over narrow highways, were the same not adjustable upon the supporting frame C. However, when it is desired to transport the machine A from a field or over a roadway, the container 63 may be adjusted over the trackway 26 until the same is longitudinally disposed with respect to the machine, as indicated in the dotted lines in Figure 1 of the drawings. From this arrangement, the purpose of providing the spaced tongues 110 and 111 can readily be understood since thereby the draft animals cannot interfere with the position of the container 63.

In order to retain the feed arrangement D in a definite position upon the trackway 26, spring arms 115ª have been connected at an end of each, as by rivet 116, to the outside surface of the guide members 76 and 77. Pins 117 are supported upon the other end of each of the arms 115 in resilient manner with respect to the rivet 116. The extreme free ends 118 of the spring arms 115 are outturned so that said arms may be flexed to displace the pins 117 from any of the apertures 119 which are transversely provided through the trackway flange portion 28 at suitable distances. It thus can be readily understood that when the pins 117 are in any of the apertures 119, the feed arrangement and container 63 is fixedly positioned with respect to the trackway 26.

From the foregoing description of this invention, it can readily be understood that a seed sowing machine has been provided, which is compact in arrangement, and which can be operated with ease by a single individual to sow seeds over a relatively great area in a minimum of the time. The machine is practical in that the same includes a relatively long distributing container which may be adjusted to be in an out of the way position during transportation of the seed.

Various changes in the shape, size and arrangement of parts may be made to the form of the invention herein shown or described, without departing from the spirit of the invention or the scope of the claims.

I claim:

1. A seed sowing machine comprising a running gear, a supporting frame, an elongated seed container pivoted about midway between its ends on the supporting frame for adjustment with respect thereto in a horizontal plane, a vertical operating shaft rotatably carried by said supporting frame and seed container substantially centrally of the ends of the container in the pivot axis of said container, means for operating said vertical shaft from the running gear of said machine, seed distributing shafts extending from said vertical shaft within the container, and gear means connecting said distributing shafts to the vertical shaft for drive purposes and permitting horizontal adjustment of said container on the supporting frame.

2. In a seed sowing machine the combination of running gear, a supporting frame including a fixed substantially ring-shaped trackway, an elongated seed container, means mounting said seed container over and upon said trackway for rotation upon the trackway axially of the latter, a vertical shaft disposed axially of the ring-shaped trackway, means connecting the vertical shaft with the running gear for drive of said shaft, seed distributing shafts in said elongated seed container having their meeting ends arranged adjacent said vertical shaft, and means connecting the vertical shaft with said seed distributing shafts for drive of the latter.

3. In a seed sowing machine the combination of running gear, a supporting frame comprising an annular trackway which is substantially L-shaped at any cross section thereof, comprising a horizontally disposed top flange and a depending vertically disposed annular flange, an elongated seed distributing container resting upon and over said horizontal flange of the annular trackway, guide members connected with said elongated seed container in abutting sliding relation with the vertically disposed depending flange of the trackway having hooked ends engaging below the said vertical flange of the trackway for rotatably supporting the container upon said trackway for rotation about the axis of said trackway, means for distributing seed longitudinally in said container, and means connecting said seed distributing means with the running gear for operation of the seed distributing means.

PAUL J. HASE.